US012001430B2

(12) United States Patent
Brown et al.

(10) Patent No.: US 12,001,430 B2
(45) Date of Patent: Jun. 4, 2024

(54) SERVICE LEVEL GOAL PROCESSING FOR MULTI-ENVIRONMENT DATA ENGINE REQUESTS

(71) Applicant: Teradata Corporation, Dayton, OH (US)

(72) Inventors: Douglas Paul Brown, Rancho Santa Fe, CA (US); Michael Sean McIntire, Sacramento, CA (US); Prama Agarwal, Irvine, CA (US)

(73) Assignee: Teradata US, Inc., San Diego, CA (US)

( * ) Notice: Subject to any disclaimer, the term of this patent is extended or adjusted under 35 U.S.C. 154(b) by 183 days.

(21) Appl. No.: 16/296,732

(22) Filed: Mar. 8, 2019

(65) Prior Publication Data

US 2020/0210428 A1 Jul. 2, 2020

Related U.S. Application Data

(60) Provisional application No. 62/785,877, filed on Dec. 28, 2018.

(51) Int. Cl.
*G06F 16/2453* (2019.01)
*G06F 9/54* (2006.01)

(52) U.S. Cl.
CPC ........ *G06F 16/24542* (2019.01); *G06F 9/547* (2013.01)

(58) Field of Classification Search
CPC ............... G06F 16/24542; G06F 9/547; G06F 2209/549
See application file for complete search history.

(56) References Cited

U.S. PATENT DOCUMENTS

| 6,263,345 B1 * | 7/2001 | Farrar ................. G06F 16/2462 707/688 |
| 8,335,767 B2 * | 12/2012 | Das .................... G06F 16/24542 707/661 |
| 8,775,413 B2 * | 7/2014 | Brown ............... G06F 16/24549 707/718 |
| 2004/0010488 A1 * | 1/2004 | Chaudhuri .......... G06F 16/2462 |
| 2006/0195416 A1 * | 8/2006 | Ewen .................. G06F 16/2471 |
| 2015/0149436 A1 * | 5/2015 | McKenna ........... G06F 16/2453 707/718 |

* cited by examiner

*Primary Examiner* — Hosain T Alam
*Assistant Examiner* — Chongsuh Park
(74) *Attorney, Agent, or Firm* — Gates & Cooper LLP (57) ABSTRACT

A data engine request is received on a local data system. The data engine request includes a portion of the request that is to be processed on an external data engine system. The portion is forwarded to the external data engine system and statistics for accessing external objects of the external data engine system is acquired. The statistics are evaluated for compliance with a Service Level Goal (SLG) associated with the request. Rules-based processing permits optimization and planning of the request on the local data engine system to be modified in view of the statistics received from the external data engine system to comply with the SLG. In an embodiment, actual resource utilization metrics noted during execution of the portion on the external data engine system is provided as feedback to the local data engine system for re-planning and re-optimizing the request with a modified execution plan.

19 Claims, 4 Drawing Sheets

SERVICE LEVEL GOAL PROCESSING FOR MULTI-ENVIRONMENT DATA ENGINE REQUESTS

RELATED APPLICATIONS

The present application claims priority to and is a non-provisional of U.S. Provisional Application No. 62/785,877 filed on Dec. 28, 2018 and entitled: "Service Level Goal Processing for Multi-Environment Database Requests," the disclosure of which is incorporated by reference herein in its entirety.

BACKGROUND

Database users demand high and predictable performance for access to their data. Often enterprises outsource management of their database to third-party providers. In doing this, the users/customers often reduce their needs into contractual obligations referred to as Service Level Agreements (SLA) that dictate data availability requirements, accuracy of results, query response times, and support on the third-party providers.

However, the trend in the industry is for users to have their data spread out: over multiple providers, in multiple disparate formats (relational and/or non-relational) and/or in multiple disparate systems. These providers often have different database systems, such that database administrators (DBAs) have no ability to ensure existing contractual obligations associated with user SLAs because one provider has no ability to control a foreign database environment of another provider. It is difficult enough to have one database management system (DBMS) integrate with a foreign DBMS to satisfy a database query of the user, without trying to satisfy a user-imposed query response time for the query.

In multi-provider and/or multiple data format environments, effectively sharing system resources across different database systems while maintaining priority directives outlined by user/customer SLAs is extremely challenging.

SUMMARY

In various embodiments, methods and a system for Service Level Goal (SLG) processing on multi-environment database requests are provided.

In one embodiment, a method for SLG processing on multi-environment database requests is provided. A database request is received on a local database system. A portion of the database request that is to be processed by an external database system is identified. Statistics are obtained from an external resource of the external database system used in fulfilling the portion on the external database system. An optimization and an execution plan are modified for processing the database request on the local database system based on the statistics and a Service Level Goal (SLG) associated with the database request.

DETAILED DESCRIPTION

Figure 1:
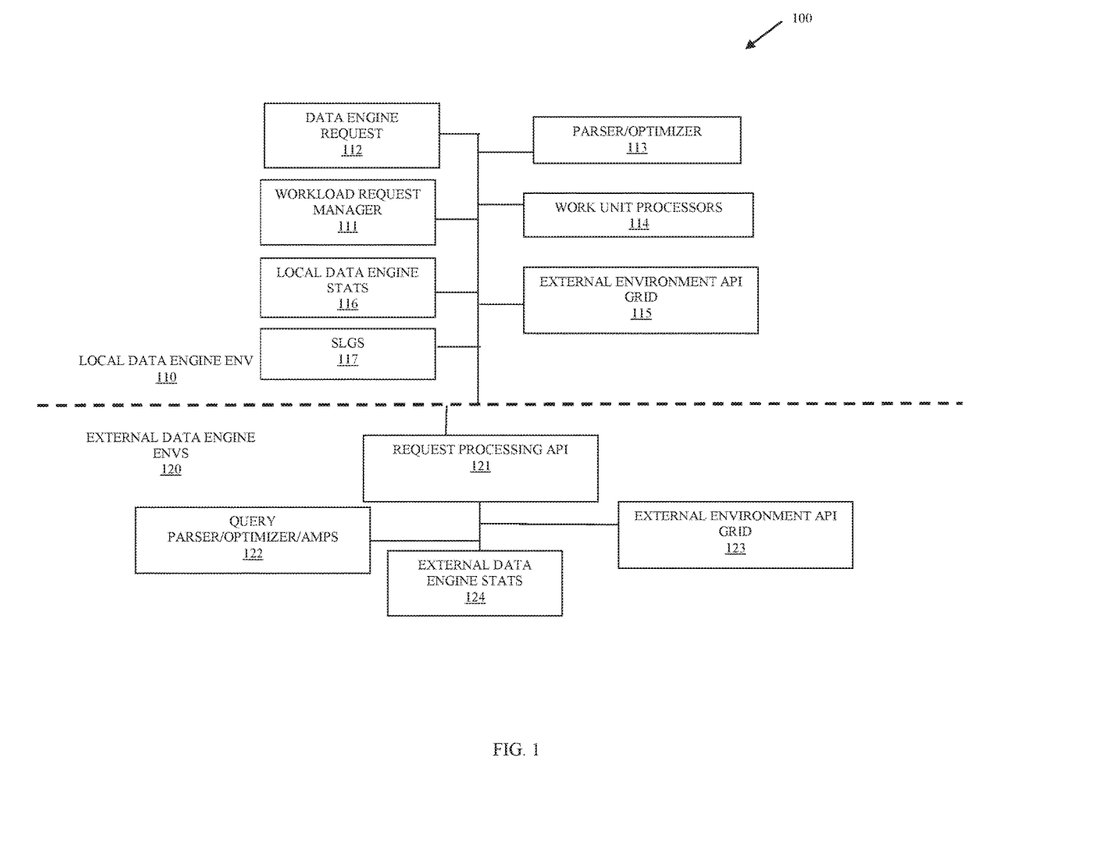
FIG. 1 is a diagram of a system for SLG processing on multi-environment data engine requests, according to an embodiment.

FIG. 1 is a diagram of a system 100 for SLG processing on multi-environment data engine requests, according to an embodiment. The system 100 is shown in greatly simplified form with just those components necessary for understanding the teachings of SLG processing on multi-environment data engine requests being illustrated. It is to be noted that a variety of other components or less components can be employed without departing for the teachings of SLG processing on multi-environment data engine requests presented herein and below.

The system 100 includes a local data engine environment 110 (local Data Engine Management System (DBMS 110). The local DBMS 110 includes data requests 112 (queries and other data engine operations), a workload request manager 111, a parser/optimizer 113, a plurality of Work Unit Processors (WUPs) 114, an external environment Application Programming Interface (API) grid 115, local data engine (DB) statistics 116, and Service Level Goals (SLGs) for the data engine requests 112. The system 100 also includes one or more external DB environments (external DBMS) 120. The external DBMS 120 includes a request processing API 121, an equivalent to a parser/optimizer/WUPs 122 (herein after external query processing service 122), an external environment API grid 123, and external DB statistics 124.

As used herein, the terms and phrases "data engine," and "data processing engine," may be used interchangeably and synonymously. The terms refer to interactions with data, which can include: databases, data warehouses that span multiple disparate databases, graph engines, general transformation to include graphs in use with machine learning/deep learning or proximity enabling, spherical systems such as geographical information system (GIS), and/or nested array systems.

Furthermore, a SLG 117 refers to a predefined set of one or more performance criteria that are to be satisfied during execution of a data engine request 112. The SLG 117 can be set within the workload request manager 111 by a DBA, as one example. By way of example only, an SLG 117 can be one or more of: a target response time, a target service level, an enforcement of a policy, a contract negotiation, and others. In a specific example, a SLG 117 for data engine requests 112 for a particular workload group can be less than 1 second of response time for processing the data engine requests 112 95% of the time the data engine requests 112 are processed. As another example, the data engine requests 112 are data engine queries that according to an SLG 117 requires 1,000 queries be processed per hour.

A Unified Data Architecture (UDA) refers to a multi-systems environment that spans multiple DBMS.

As described more completely herein and below, the system 100 provides processing for a Contract Negotiated SLG (CNSLG) 117 for multi-systems (UDA). A new and novel classification criteria is provided in the workload request management 111 allowing components of the system 100 to properly manage or determine whether the SLG 117 can even be satisfied utilizing the external environment API grid 115. Moreover, when the system 100 determines that a SLG 117 for a given request 112 cannot be satisfied, the workload request manager 111 provides the local DBA with automated alternative processing for the request 112.

The parser/optimizer 113 initially parses the request 112 and identifies a reference to a foreign table/remote function/object. The parser/optimizer 113 utilizes the external environment API grid 115 to determine where (location) and how (interface to the requesting processing API 121) the foreign table/remote function/object is to be accessed. Other portions of the request 112 that can be processed independently of the external table/remote function/object are costed out by the parser/optimizer 113 and the WUPs 114 on the local DBMS 110 utilizing metadata (statistics) from the local DB stats 116.

In an embodiment, the reference is any remote function or remote/external function/object.

As used herein "statistics" of "metrics" can include histograms (such as an equal height histogram and other types of histograms), min/max/mean values in the histograms, counts, sizes, approximation of blocks, superset/subset valuations or to estimate a curve amongst different histograms to predict confidence and accuracy based on actual values.

Assuming the external DBMS 120 is capable of providing costing based metadata statistics about the foreign table/object/remote function, an option can be set by the parser/optimizer 113 when contacting the external DBMS 120 to return the metadata statistics for the foreign table/object/remote function without actually executing the portion of the request 112 on the external DBMS 120. Here, the parser/optimizer/WUPs 122 utilizes its external DB stats 124 to acquire the metadata statistics and returns such metadata statistics to the parser/optimizer 113 of the local DBMS 110.

It is to be noted that there can be multiple levels of nesting within the request 112, such that the portion provided to the external DBMS 120 includes yet another reference to a table/object that is foreign/remote function/object to the external DBMS 120. Here, the external environment API 123 is utilized in the same manner discussed above for the local DBMS 110 and such metadata statistics associated with a second external DBMS 120 is returned to the original external DBMS 120. Both the metadata statistics associated with the first and second external DBMSs 120 are returned back to the local parser/optimizer 113. This represents consolidated statistics for nested query execution on the one or more systems and not separate stats.

In an embodiment, local parser/optimizer 113 then integrates the external metadata statistics associated with accessing the foreign table/object/remote function of one or more external DBMSs 120 and completes costing and planning for executing the original request 112.

In an embodiment, the metadata statistics returned from the external DBMS 120 is a combination of the number of rows and a row size associated with the foreign table (i.e., columns)/remote function (complex column group) that will that will be transferred in satisfying the portion of the request 112 by the external DBMS 120.

In an embodiment, the metadata statistics are an estimated cardinality representing the number of rows in any intermediate tables that need to be created by the external DBMS 120 to satisfy the portion of the request 112 that the external DBMS 120 is to process.

The returned metadata statistics from the external DBMS 120 is then provided to the workload request manager 111 and verified against a new CNSLG classification criteria, which is built based on remote request estimates associated with the external DBMS 120 and new automated actions that can be taken based thereon. For example, the automated actions can include re-planning the request 112, re-classification of the request 112, demotion of the request 112 in terms of priority within the local DBMS 110, boosting priority within the local DBMS 110, filtering, logging, rejecting the request 112 entirely because it cannot satisfy its associated SLG 117, alerting a DBA that the request 112 is dangerously close (based on a threshold) of not satisfying its associated SLG 117, throttle hardware and software resources to achieve the SLG 117 for the request 112, changing hardware and software resources to achieve the SLG 117 for the request 112, and the like.

Once the CNSLG classification criteria is set for the portion of the request 112 that is to be processed on the external DBMS 120, the parser/optimizer 113 and/or the WUPs 114 complete the request execution plan and request costing. The request 112 is then scheduled for execution and executed. During the execution phase, the actual execution statistics from the external DBMS 120 is dynamically obtained and brought back into the local DBMS 110 as the request 112 is executed. If resource (hardware and/or software) utilization, at any point, exceeds what was expected in the original request execution plan, the request initiator can be alerted and the resource utilization is provided to the workload request manager 111, which can take an appropriate exception desired by the user's specific SLG/CNSLG 117; for example, automatically demote, boost, abort, or log the rest of the request's execution.

Because metadata or costing statistics may have a different data format in the external DBMSs 120 from that which is processed by the local DBMS 110, the metadata or performance costing statistics are normalized by the local DBMS 120 for integration into the costing and execution planning for the request 112.

The contract negotiation with respect to integration of the external DBMS statistics for SLG 117 verification or modification is established by the workload request manager 111. Modification is based on predefined rules that changes a CNSLG 117 classification, which then drives automated processing actions in an effort to fulfill the request's overall SLG 117. The statistics integration is provided by both the local DBMS 110 and the external DBMS 120.

As used herein "contract negotiation" includes: establishing a structure of a datum being passed in an out of a remote function at compile time (pre-request); dynamically creation of a data structure during execution and establishing that data structure between multiple entities (functions) for use. So, contract negotiation can be static or dynamic.

The system 100 performs two phases of operation, a metadata phase during which a determination is made how to meet a request's SLG 117 through the metadata statistics of both the local DBMS 110 and the external DBMSs 120. The rules and reclassification of CNSLGs 117 by the workload request manager 117 allows for proper planning and costing of the request by the local parser/optimizer 112 (with or without automated changes forced on the parser/optimizer 112 by the workload request manager 117). The second phase integrates the actual execution of the request 112 on the external DBMSs 120 along with the actual resource utilization and execution metrics back into the workload request manager 111 with or without changes being made to the original request 112.

In cases where the external DBMS 120 is incapable of returning costing statistics, the portion of the request 112 that is required of the external DBMS 120 can be submitted for execution or a modified version of the request 112 (such as to account for peek and non-peek values in the request 112). Any execution-based statistics (such as elapsed time) or anything else provided by the external DBMS 120 with the processing can be noted and utilized as the metadata statistics in optimizing and planning the rest of the request 112.

In an embodiment, the indices/complex column group of the foreign table/remote function needed of the external DBMS 120 are sampled to obtain histograms. This histograms are used as the metadata statistics.

The system 100 allows for improved request 112 optimization, planning, and costing in multi DBMSs. The metadata statistics associated with the DBMSs are used to drive the optimization, planning, and costing of the request 112 and a rules-based approach is employed for automated modification and adjustments. Furthermore, actual execution metrics from the external DBMSs 120 can be provided as feedback back into the workload request manager 111 for further adjustments or for a determination that the SLG 117 for the request 112 simply cannot be obtained. The external DBMS 120 actual execution metrics may also be retained in the local DBMS 110 allowing for investigation and probing on potential problem areas identified with the external DBMS's resources. Such, actual execution metrics can also be used to demonstrate that non-compliance of a SLG 117 for a request 112 is an issue with the external DBMS 120 and not with the local DBMS 110.

These and other embodiments will now be discussed with reference to the FIGS. 2-4.

Figure 2:
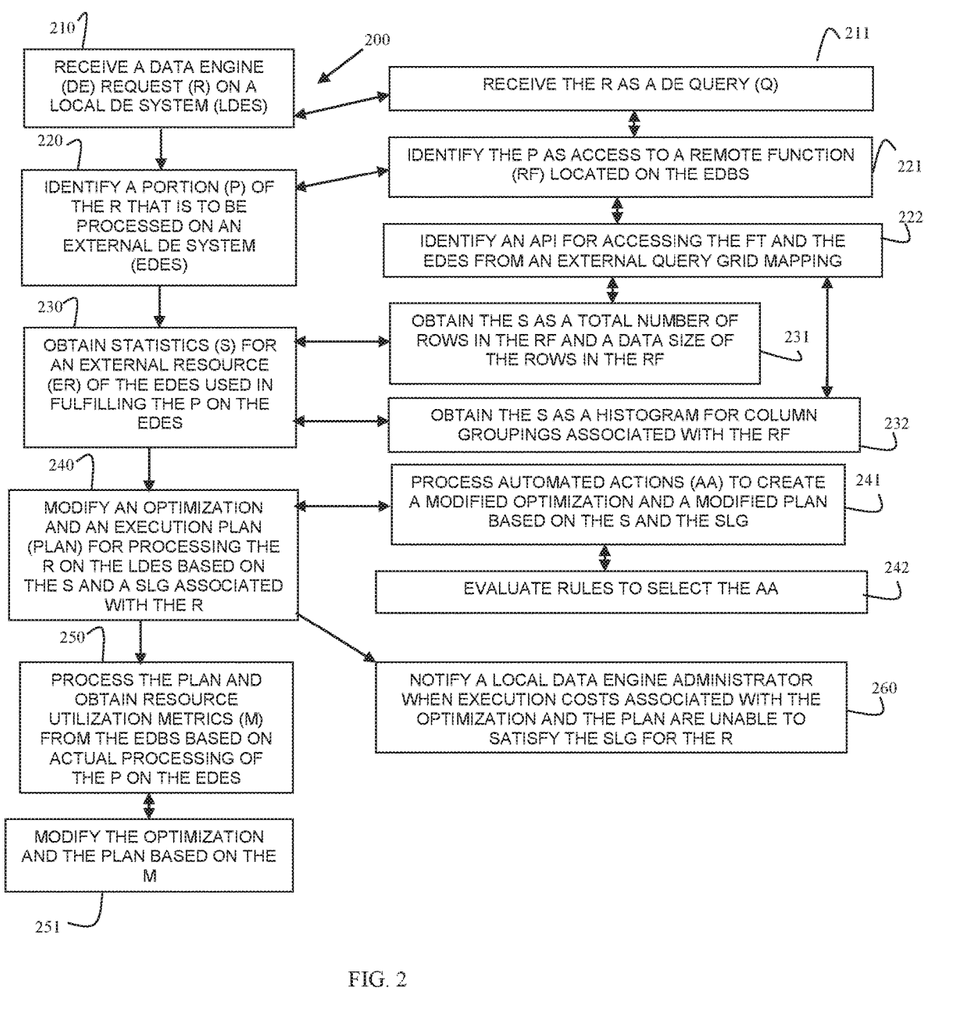
FIG. 2 is a diagram of a method for SLG processing on a multi-environment data engine request, according to an example embodiment.

FIG. 2 is a diagram of a method 200 for SLG processing on a multi-environment data engine request, according to an example embodiment. The method 200 is implemented as one or more software modules referred to as a "workload SLG controller"). The workload SLG controller represents executable instructions that are programmed within memory or a non-transitory computer-readable medium and executed by one or more hardware processors of one or more devices. The workload SLG controller may have access to one or more network connections during processing, which can be wired, wireless, or a combination of wired and wireless.

In an embodiment, the workload SLG controller executes on devices of a data warehouse across one or more physical devices or nodes (computing devices) for execution over one or more network connections.

In an embodiment, the workload SLG controller is all or of or any combination of: the workload request manager 111, the parser/optimizer 113, the WUPs 114, and/or the external environment API grid 115.

At 210, the workload SLG controller receives a data engine request on a local DBMS.

In an embodiment, at 211, the workload SLG controller receives the request as a DB query.

At 220, the workload SLG controller identifies a portion of the data engine request that is to be processed on an external DBMS.

In an embodiment, the local DBMS is a relational DBMS and the external DBMS is a non-relational DBMS.

According to an embodiment of 211 and 220, at 221, the workload SLG controller identifies the portion as access to a foreign table/remote function/remote object located on the external DBMS.

In an embodiment of 221 and at 222, the workload SLG controller identifies an API for accessing the foreign table/remote function and the external DBMS from an external grid mapping, such a mapping provided by the external environment API grid 115.

At 230, the workload SLG controller obtains statistics for an external resource of the external DBMS. The external resource used by the external DBMS to fulfill the portion of the data engine request on the external DBMS.

In an embodiment of 222 and 230, at 231 the workload SLG controller obtains the statistics as a total number of rows in the foreign table/remote function and a data size of the rows in the foreign table/remote function.

In an embodiment of 222 and 230, at 232, the workload SLG controller obtains the statistics as a histogram for indices/complex column group associated with the foreign table/remote function/remote object.

In an embodiment, the workload SLG controller obtains the statistics as a histogram for any given complex column group for which the indices/complex column group are a subset of that column group.

The workload SLG controller then normalizes the statistics for optimization and generating an execution plan.

At 240, the workload SLG controller modifies an optimization and an execution plan for processing the data engine request on the local DBMS based on the statistics and a SLG associated with the data engine request.

In an embodiment, at 241 the workload SLG controller processes automated actions to create a modified optimization and a modified request execution plan based on the statistics and the SLG.

In an embodiment of 241 and at 242, the workload SLG controller evaluates rules to select the automated actions.

In an embodiment, at 250, the workload SLG controller processes the request execution plan and obtains resource utilization metrics from the external DBMS based on actual processing of the portion on the external DBMS.

In an embodiment, at 251, the workload SLG controller modifies the optimization and the request execution plan based on the resource utilization metrics.

In an embodiment, at 260, the workload SLG controller notifies a local DBA when execution costs associated with the optimization and the request execution plan are unable to satisfy the SLG for the data engine request.

Figure 3:
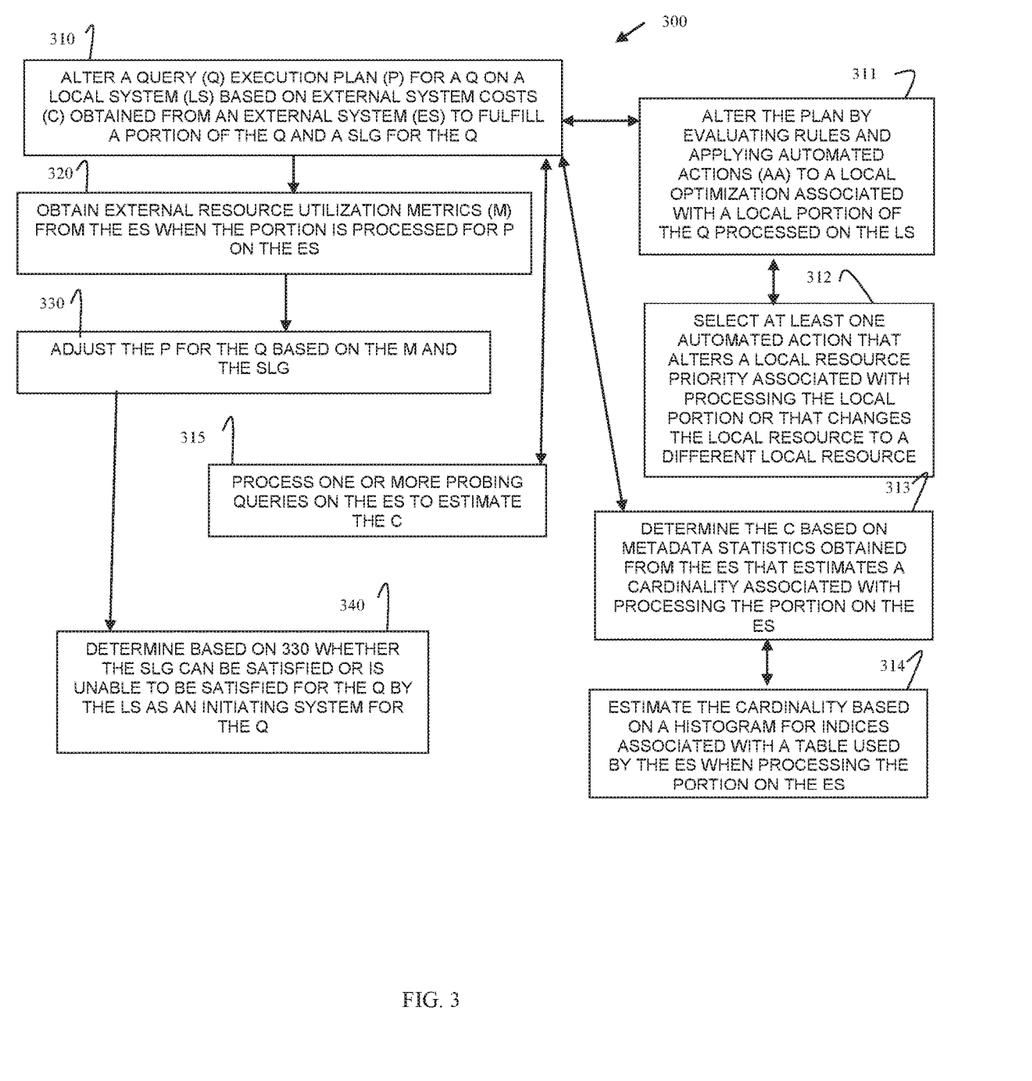
FIG. 3 is a diagram of another method for SLG processing on a multi-environment data engine request, according to an example embodiment.

FIG. 3 is a diagram of another method 300 for SLG processing on a multi-environment data engine request, according to an embodiment. The method 300 is implemented as one or more software modules referred to as a "query SLG manager." The query SLG manager represents executable instructions that are programmed within memory or a non-transitory computer-readable medium and executed by one or more hardware processors of a device. The query SLG manager may have access to one or more network connections during processing, which can be wired, wireless, or a combination of wired and wireless.

The processing depicted for the query SLG manager in the FIG. 3 presents another and, in some ways, enhanced perspective of the processing discussed above with the FIGS. 1 and 2.

In an embodiment, the query SLG manager is all of or any combination of: the workload request manager 111, the parser/optimizer 113, the WUPs 114, the external environment API grid 115, and/or the method 200.

At 310, the query SLG manager alters a query execution plan (plan) for a query on a local system based on external system costs obtained from an external system to fulfill a portion of the query and a SLG associated with the query.

In an embodiment, at 311, the query SLG manager alters the plan by evaluating rules and applying automated actions to a local optimization associated with a local portion of the query processed on the local system.

In an embodiment of 311, at 312, the query SLG manager selects at least one automated action that alters a local resource priority associated with processing the local portion or that changes the local resource to a different local resource. The local resource can be a hardware or a software resource or a combination of both a hardware and a software resource.

In an embodiment, at 313, the query SLG manager determines the execution system costs based on metadata statistics obtained from the external system that estimates a cardinality associated with processing the portion on the external system.

In an embodiment of 313 and at 314, the query SLG manager estimates the cardinality based on a histogram for indices/complex column groups associated with a table used by the external system when processing the portion on the external system.

In an embodiment, at 315, the query SLG manager processes one or more probing queries on the external system to estimate the execution system costs.

At 320, the query SLG manager obtains external resource utilization metrics from the external system when the portion is processed for the portion on the external system.

At 330, the query SLG manager adjusts the query execution plan for the query on the local system based on the resource utilization metrics and the SLG. That is, the existing plan and its costs including the external system costs for the external system utilize the resource utilization metrics of the external system for actually processing the portion as feedback for adjusting the query execution plan.

In an embodiment, at 340, the query SLG manager determines based on 330 whether the SLG can be satisfied or is unable to be satisfied for the query by the local system as an initiating system for the query.

Figure 4:
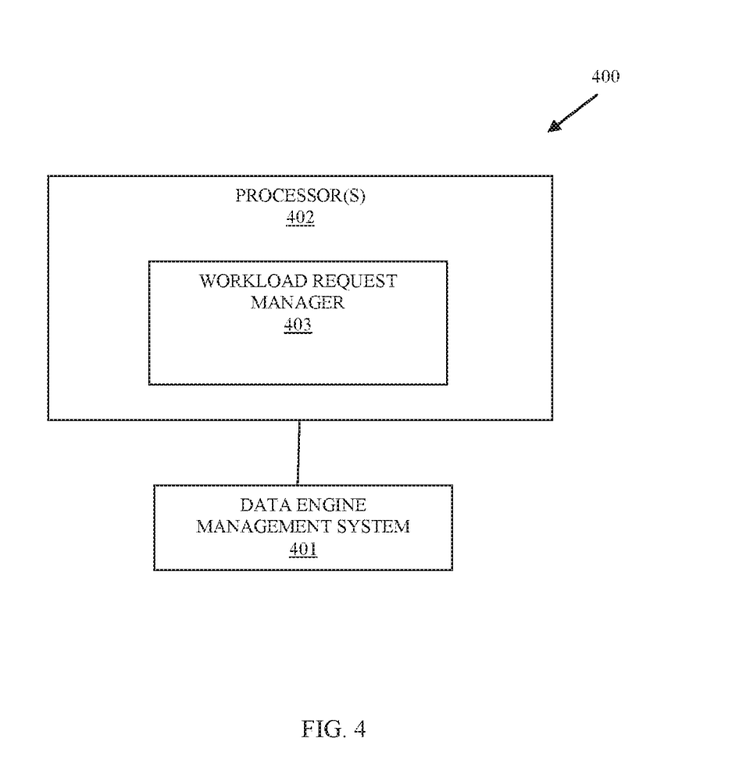
FIG. 4 is a diagram of a system for SLG processing on a multi-environment data engine request, according to an example embodiment.

FIG. 4 is a diagram of a system 400 for SLG processing on a multi-environment data engine request, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter alia, the processing discussed above with the FIGS. 1-3.

The system 400 includes: a DBMS 401, at least one hardware processor 402 and a non-transitory computer-readable storage medium having executable instructions representing a workload request manager 403.

The workload request manager 403 when executed on at least one hardware processor 402 from the non-transitory computer-readable storage medium performs processing to: integrate external statistics associated with an external data engine management system fulfilling a portion of a request with local statistics associated with the DBMS 401 fulfilling a second portion of the request; estimate external costs based on the external statistics; and modify a request execution plan on the DBMS 401 based on the external costs and a SLG associated with the request.

In an embodiment, the workload request manager 403 is further configured to perform processing to assign the external costs to a contract negotiation SLG category and apply rules based on the contract negotiation SLG category to process automated actions to modify the request execution plan.

In an embodiment, the workload request manager 403 is the workload request manager 111 and the DBMS 401 is the local DBMS 110.

In an embodiment, the workload request manager 403 is all or some combination of: the workload request manager 111, the optimizer/parser 113, the WUPs 114, the external environment API grid 115, the method 200, and/or the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving, on a local data engine system, a data engine request, the local data engine system comprising a local database management system (DBMS);
   identifying, on the local data engine system, a portion of the data engine request that is to be processed by an external data engine system, the external data engine system comprising an external DBMS different from the local DBMS, and a local portion of the data engine request that is to be processed by the local data engine system;
   obtaining, on the local data engine system, external statistics from an external resource of the external data engine system to be used in fulfilling the portion of the data engine request that is to be processed by the external data engine system;
   evaluating, on the local data engine system, the external statistics from the external resource of the external data engine system for compliance with Contract Negotiated Service Level Goal (CNSLG) classification criteria of a Service Level Goal (SLG) associated with the data engine request;
   determining whether the SLG can be satisfied using the external data source based on the CNSLG classification criteria, wherein the CNSLG classification criteria provides automated actions that can be taken based on the external statistics from the external resource of the external data engine system;
   when the CNSLG classification criteria determines that the SLG cannot be satisfied using the external data source:
      providing a local database administrator (DBA) with automated alternative processing for the data engine request;
   when the CNSLG classification criteria determines that the SLG can be satisfied using the external data source:
      modifying, on the local data engine system, an optimization and an execution plan for processing the portion of the data engine request that is to be processed by an external data engine system and the local portion of the data engine request that is to be processed by the local data engine system, based on the automated actions of the CNSLG classification criteria associated with the data engine request;
      obtaining, on the local data engine system, actual resource utilization metrics from the external data engine system for the portion of the data engine request that was processed by the external data engine system;
      evaluating, on the local data engine system, the actual resource utilization metrics from the external data engine system for compliance with the SLG associated with the data engine request; and
      performing, on the local data engine system, further adjustments of the modified optimization and the modified execution plan, or a determination that the SLG associated with the data engine request cannot be satisfied, based on the evaluation of the actual resource utilization metrics.

2. The method of claim 1, wherein receiving further includes receiving the data engine request as a data engine query.

3. The method of claim 2, wherein identifying further includes identifying the portion that is to be processed by the external data engine system as access to a remote function located on the external data engine system.

4. The method of claim 3, wherein identifying further includes identifying an Application Programming Interface (API) for accessing the remote function and the external data engine system from an external query grid mapping.

5. The method of claim 4, wherein obtaining further includes obtaining the external statistics as a total number of rows in the remote function and a data size of the rows in the remote function.

6. The method of claim 4, wherein obtaining further includes obtaining the external statistics as a histogram for column groupings associated with the remote function.

7. The method of claim 1, wherein modifying further includes processing the automated actions to create the modified optimization and the modified execution plan based on the external statistics and the SLG.

8. The method of claim 7, wherein processing further includes evaluating rules to select the automated actions.

9. The method of claim 1 further comprising, notifying a local data engine administrator when the external statistics or the actual resource utilization metrics are unable to satisfy the CNSLG classification criteria or SLG for the data engine request.

10. A method comprising:
obtaining, on a local database management system, external system costs from an external database management system different from the local database management system to fulfill a portion of a query that is to be processed by the external database management system;
evaluating, on the local database management system, the external system costs from the external database management system for compliance with a Contract Negotiated Service Level Goal (CNSLG) classification criteria of a Service Level Goal (SLG) associated with the query;
determining whether the SLG can be satisfied using the external database management system based on the CNSLG classification criteria, wherein the CNSLG classification criteria provides automated actions that can be taken based on the external system costs from the external database management system;
when the CNSLG classification criteria determines that the SLG cannot be satisfied using the external database management system:
providing a local database administrator (DBA) with automated alternative processing for the query;
when the CNSLG classification criteria determines that the SLG can be satisfied using the external database management system:
altering a query execution plan for the query on the local database management system based on the external system costs obtained from the external database management system to fulfill the portion of the query that is to be processed on the external database management system and the CNSLG classification criteria of the SLG for the query, wherein the altering further includes altering both the portion of the query to be processed on the external database management system and a local portion of the query to be processed on the local database management system;
obtaining actual resource utilization metrics from the external database management system when the portion of the query is processed on the external database management system;
evaluating the actual resource utilization metrics as the external system costs for compliance with the SLG for the query; and
adjusting the query execution plan for the query based on the evaluation of the actual resource utilization metrics and the SLG.

11. The method of claim 10, wherein altering further includes altering the query execution plan by evaluating rules and applying the automated actions to a local optimization associated with the local portion of the query processed on the local database management system.

12. The method of claim 11, wherein applying the automated actions comprises selecting at least one of the automated actions that alters a local resource priority associated with processing the local portion or that changes the local resource to a different local resource.

13. The method of claim 10, wherein altering further includes determining the external system costs based on metadata statistics obtained from the external database management system that estimates a cardinality associated with processing the portion on the external database management system.

14. The method of claim 13, wherein determining further includes estimating the cardinality based on a histogram for indices associated with a table used by the external database management system when processing the portion on the external database management system.

15. The method of claim 10, wherein altering further includes process one or more probing queries on the external database management system to estimate the external system costs.

16. The method of claim 10 further comprising, determining based on the adjusting whether the SLG can be satisfied or is unable to be satisfied for the query by the local database management system as an initiating system for the query.

17. A system, comprising:
a local database management system;
at least one hardware processor;
a non-transitory computer-readable storage medium having executable instructions representing a workload request manager;
the workload request manager configured to execute on the at least one hardware processor from the non-transitory computer-readable storage medium and to perform processing to:
integrate external statistics associated with an external database management system different from the local database management system fulfilling a portion of a request that is processed on the external database management system with local statistics associated with the local database management system fulfilling a local portion of the request that is processed on the local database management system;
estimate external costs for the external database management system fulfilling the portion of a request that is processed on the external database management system based on the external statistics;
evaluate the external costs for the external database management system for compliance with a Contract Negotiated Service Level Goal (CNSLG) category of a Service Level Goal (SLG) associated with the request;

determine whether the SLG can be satisfied using the external database management system based on the CNSLG category, wherein the CNSLG category provides automated actions that can be taken based on the external costs for the external database management system;

when the CNSLG category determines that the SLG cannot be satisfied using the external database management system:

providing a local database administrator (DBA) with automated alternative processing for the request;

when the CNSLG category determines that the SLG can be satisfied using the external database management system:

modify a request execution plan on the local database management system for the portion of the request that is processed on the external database management system and the local portion of the request that is processed on the local database management system, based on the estimated external costs and the CNSLG category of the SLG associated with the request;

obtain actual resource utilization metrics on the local database management system from the external database management system for the portion of the request that was processed by the external database management system;

evaluate the actual resource utilization metrics on the local database management system for compliance with the SLG associated with the request; and     perform further adjustments of the modified request execution plan on the local database management system, or a determination that the SLG associated with the request cannot be satisfied, based on the evaluated actual resource utilization metrics.

18. The system of claim 17, wherein the workload request manager is further configured to perform processing to assign the external costs to the CNSLG category and apply rules based on the CNSLG category to process the automated actions to modify the request execution plan.

19. The method of claim 1, wherein the automated actions include:

re-planning the data engine request, re-classification of the data engine request, demotion of the data engine request in terms of priority within the local DBMS, boosting priority of the data engine request within the local DBMS, filtering, logging, rejecting the data engine request entirely because it cannot satisfy its associated SLG, alerting a database administrator (DBA) that the data engine request is close to not satisfying its associated SLG, throttle hardware and software resources to achieve the SLG for the data engine request, or changing hardware and software resources to achieve the SLG for the data engine request.

\* \* \* \* \*